(12) United States Patent
Lee et al.

(10) Patent No.: US 11,086,177 B2
(45) Date of Patent: Aug. 10, 2021

(54) DISPLAY APPARATUS

(71) Applicant: SAMSUNG DISPLAY CO., LTD., Yongin-Si (KR)

(72) Inventors: Gichang Lee, Asan-si (KR); Insoo Wang, Asan-Si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/356,548

(22) Filed: Mar. 18, 2019

(65) Prior Publication Data

US 2019/0212621 A1 Jul. 11, 2019

Related U.S. Application Data

(62) Division of application No. 14/989,025, filed on Jan. 6, 2016, now abandoned.

(30) Foreign Application Priority Data

Jan. 26, 2015 (KR) ........................ 10-2015-0012291

(51) Int. Cl.
*G02F 1/1362* (2006.01)
*G02F 1/1343* (2006.01)

(52) U.S. Cl.
CPC .... *G02F 1/136213* (2013.01); *G02F 1/13624* (2013.01); *G02F 1/134345* (2021.01)

(58) Field of Classification Search
None
See application file for complete search history.

(56) References Cited

U.S. PATENT DOCUMENTS

| | | | |
|---|---|---|---|
| 7,843,520 B2 | 11/2010 | Lu et al. | |
| 7,903,068 B2 | 3/2011 | Chen et al. | |
| 8,174,636 B2 | 5/2012 | Chen et al. | |
| 9,013,387 B2 | 4/2015 | Lo et al. | |
| 9,500,922 B2 | 11/2016 | Jiang et al. | |
| 10,222,668 B2 * | 3/2019 | Chen ..................... | G02F 1/1368 |

(Continued)

FOREIGN PATENT DOCUMENTS

| | | |
|---|---|---|
| CN | 101364017 | 2/2009 |
| CN | 101566771 | 10/2009 |

(Continued)

OTHER PUBLICATIONS

Examination Report dated Jul. 26, 2019 in corresponding CN Patent Application No. 201610051532.7.

*Primary Examiner* — Nitin Patel
(74) *Attorney, Agent, or Firm* — F. Chau & Associates, LLC

(57) ABSTRACT

A display apparatus includes a gate line, a data line, and a pixel. The pixel includes first and second pixels displaying grayscales different from each other in response to a data voltage provided through the data line. The first pixel includes a first transistor including a gate electrode connected to the gate line and a first terminal connected to the data line and a first liquid crystal capacitor connected to a second terminal of the first transistor. The second pixel includes a second transistor including a gate electrode connected to the gate line and a first terminal connected to the second terminal of the first transistor and a second liquid crystal capacitor connected to a second terminal of the second transistor.

9 Claims, 8 Drawing Sheets

(56) References Cited

U.S. PATENT DOCUMENTS

| | | | | |
|---|---|---|---|---|
| 2006/0164363 | A1* | 7/2006 | Battersby | G09G 3/3648 345/98 |
| 2008/0007506 | A1 | 1/2008 | Chen et al. | |
| 2008/0225035 | A1* | 9/2008 | Hsu | G09G 3/3696 345/212 |
| 2009/0040161 | A1* | 2/2009 | Baek | G11C 19/28 345/94 |
| 2009/0040413 | A1 | 2/2009 | Chen et al. | |
| 2009/0046216 | A1* | 2/2009 | Chen | G02F 1/13306 349/48 |
| 2009/0167660 | A1* | 7/2009 | Wang | G09G 3/3637 345/89 |
| 2010/0141643 | A1* | 6/2010 | Li | G09G 3/3648 345/214 |
| 2010/0149157 | A1* | 6/2010 | Shih | G02F 1/13624 345/211 |
| 2012/0033001 | A1* | 2/2012 | Kim | G09G 3/3659 345/697 |
| 2013/0100106 | A1* | 4/2013 | Wu | G09G 3/2025 345/212 |
| 2015/0015821 | A1 | 1/2015 | Lo et al. | |
| 2015/0092134 | A1* | 4/2015 | Jiang | G02F 1/1368 349/46 |
| 2016/0210924 | A1 | 7/2016 | Yao et al. | |
| 2016/0216582 | A1 | 7/2016 | Lee et al. | |
| 2016/0232862 | A1* | 8/2016 | Kim | G09G 3/3607 |
| 2016/0342037 | A1* | 11/2016 | Wang | G02F 1/133371 |
| 2016/0370673 | A1 | 12/2016 | Kimura | |
| 2017/0153505 | A1* | 6/2017 | Du | G02F 1/136286 |
| 2017/0269447 | A1* | 9/2017 | Du | G09G 3/2003 |
| 2018/0231851 | A1* | 8/2018 | An | G02F 1/136213 |

FOREIGN PATENT DOCUMENTS

| | | |
|---|---|---|
| CN | 102332244 | 1/2012 |
| CN | 102691083 | 7/2012 |
| CN | 103472647 | 12/2013 |
| CN | 103744208 | 4/2014 |
| KR | 1020080007203 | 1/2008 |
| KR | 1020080062542 | 7/2008 |
| KR | 1020110117998 | 10/2011 |
| KR | 1020130101329 | 9/2013 |
| TW | 200605220 | 1/2008 |

* cited by examiner

DISPLAY APPARATUS

CROSS-REFERENCE TO RELATED APPLICATION

This U.S. non-provisional patent application is a divisional application of co-pending U.S. application Ser. No. 14/989,025 filed Jan. 6, 2016, which claims priority under 35 U.S.C. § 119 to Korean Patent Application No. 10-2015-0012291, filed on Jan. 26, 2015, the disclosures of which are incorporated by reference in their entirety herein.

BACKGROUND

1. Technical Field

The present disclosure relates to a display apparatus. More particularly, the present disclosure relates to a display apparatus having improved side visibility.

2. Discussion of Related Art

A liquid crystal display applies an electric field to a liquid crystal layer disposed between two substrates and changes an alignment of liquid crystal molecules of the liquid crystal layer to control a transmittance of a light incident to the liquid crystal layer, thereby displaying a desired image. However, the liquid crystal display has a relatively narrow viewing angle, compared with other display devices.

Each pixel of a liquid crystal display may include two sub-pixels. The side visibility of such a display may be improved by driving the two sub-pixels of each pixel with different grayscales from each other. However, an aperture ratio of the display may be lowered when this technique is used. Thus, there is a need for a display device that can improve side visibility without reducing aperture ratio.

SUMMARY

At least one embodiment of the present inventive concept provides a display apparatus that improves side visibility without reducing an aperture ratio.

According to an exemplary embodiment of the inventive concept, a display apparatus is provided including a gate line, a data line, and a pixel connected to the gate line and the data line. The data line may be insulated from the gate line while crossing the gate line. The pixel includes a first pixel and a second pixel, which display grayscales different from each other in response to a data voltage provided through the data line.

The first pixel includes a first transistor including a gate electrode connected to the gate line and a first terminal (e.g., a first non-gate electrode/terminal) connected to the data line and a first liquid crystal capacitor connected to a second terminal (e.g., the second other non-gate electrode/terminal) of the first transistor.

The second pixel includes a second transistor including a gate electrode connected to the gate line and a first terminal (e.g., a first non-gate electrode/terminal) connected to the second terminal of the first transistor and a second liquid crystal capacitor connected to a second terminal (e.g., the second other non-gate electrode/terminal) of the second transistor.

In an embodiment, the second terminal of the first transistor has a first level after a predetermined time lapses from a rising time of a gate signal applied to the gate line, and the second terminal of the second transistor has a second level lower than the first level after a predetermined time lapses from the rising time of the gate signal applied to the gate line. In an embodiment, the duration of the predetermined time is the same for both transistors.

In an embodiment, the second terminal of the second transistor has a voltage level increasing slower than a voltage level of the second terminal of the first transistor.

In an embodiment, the first and second transistors have different resistances from each other while being turned on.

In an embodiment, a first electrode of the first liquid crystal capacitor is connected to the second terminal of the first transistor, a second other electrode of the first liquid crystal capacitor is applied with a common voltage, a first electrode of the second liquid crystal capacitor is connected to the second terminal of the second transistor, and a second other electrode of the second liquid crystal capacitor is applied with a common voltage.

In an embodiment, the first pixel furthers includes a first storage capacitor having a first electrode connected to the second terminal of the first transistor and a second other electrode applied with a storage voltage, and the second pixel further includes a second storage capacitor having a first electrode connected to the second terminal of the second transistor and a second other electrode applied with the storage voltage.

In an embodiment, the second pixel further includes an auxiliary resistor connected to the second transistor in series.

In an embodiment, the auxiliary resistor is connected between the second terminal of the first transistor and the first terminal of the second transistor.

In an embodiment, the auxiliary resistor includes at least one of amorphous silicon and intrinsic silicon.

According to an exemplary embodiment of the inventive concept, a display apparatus is provided including a first gate line, a second gate line disposed adjacent to the first gate line, a data line, and a pixel connected to the first gate line, the second gate line, and the data line. The data line may be insulated from the first and second gate lines while crossing the first and second gate lines. The pixel includes a first pixel and a second pixel, which display two grayscales different from each other on the basis of a data voltage provided through the data line.

The first pixel includes a first transistor including a gate electrode connected to the first gate line and a first terminal connected to the data line and a first liquid crystal capacitor connected to a second terminal of the first transistor.

The second pixel includes a second transistor including a gate electrode connected to the second gate line and a first terminal connected to the second terminal of the first transistor and a second liquid crystal capacitor connected to a second terminal of the second transistor.

In an embodiment, a first gate signal applied to the first gate line and a second gate signal applied to the second gate line are in a high state during a same horizontal scan period.

In an embodiment, the first gate signal has a first pulse height and the second gate signal has a second pulse height lower than the first pulse height.

In an embodiment, the second terminal of the first transistor has a first level after a predetermined time lapses from a rising time of the first gate signal, and the second terminal of the second transistor has a second level lower than the first level after a predetermined time lapses from the rising time of the first gate signal. In an embodiment, the predetermined time for each transistor is the same.

In an embodiment, the second pixel further includes a third transistor connected to the second transistor in series.

In an embodiment, the third transistor includes a gate electrode connected to the first gate line, a first terminal (e.g., a first non-gate electrode/terminal) connected to the second terminal of the second transistor, and a second terminal (e.g., the second other non-gate electrode/terminal) of the third transistor is connected to the second liquid crystal capacitor.

In an embodiment, the second terminal of the first transistor has a first level after a predetermined time lapses from a rising time of a gate signal applied to the first gate line, and the second terminal of the second transistor has a second level lower than the first level after a predetermined time lapses from the rising time of the gate signal applied to the gate line. In an embodiment, the predetermine time is the same for both transistors.

According to an exemplary embodiment of the inventive concept, a display apparatus is provided including a gate line, a data line, and a pixel connected to the gate line and the data line. The data line may be insulated from the gate line while crossing the gate line. The pixel includes a first pixel and a second pixel, which display grayscales different from each other in response to a data voltage provided through the data line. The pixel is driven by two transistors. For example, the first pixel includes a first transistor among the two transistors and the second pixel includes a second transistor among the two transistors. In an embodiment, a first non-gate electrode of the first transistor is connected to a first non-gate electrode of the second transistor.

In an embodiment, gate electrodes of each transistor are connected to the gate line and a second other non-gate electrode of the first transistor is connected to the data line.

In an embodiment, the first non-gate electrode of the first transistor is connected to a first liquid crystal capacitor, and a second other non-gate electrode of the second transistor is connected to a second other liquid crystal capacitor.

In an embodiment, during a period after application of a gate on voltage to the gate line, a voltage of the first non-gate electrode of the first transistor increases more quickly than a voltage of the second non-gate electrode of the second transistor.

BRIEF DESCRIPTION OF THE DRAWINGS

Embodiments of the inventive concept will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present.

As used herein, the singular forms, "a", "an" and "the" are intended to include the plural forms as well, unless the context clearly indicates otherwise.

Hereinafter, embodiments of the present inventive concept will be explained in detail with reference to the accompanying drawings.

Figure 1:
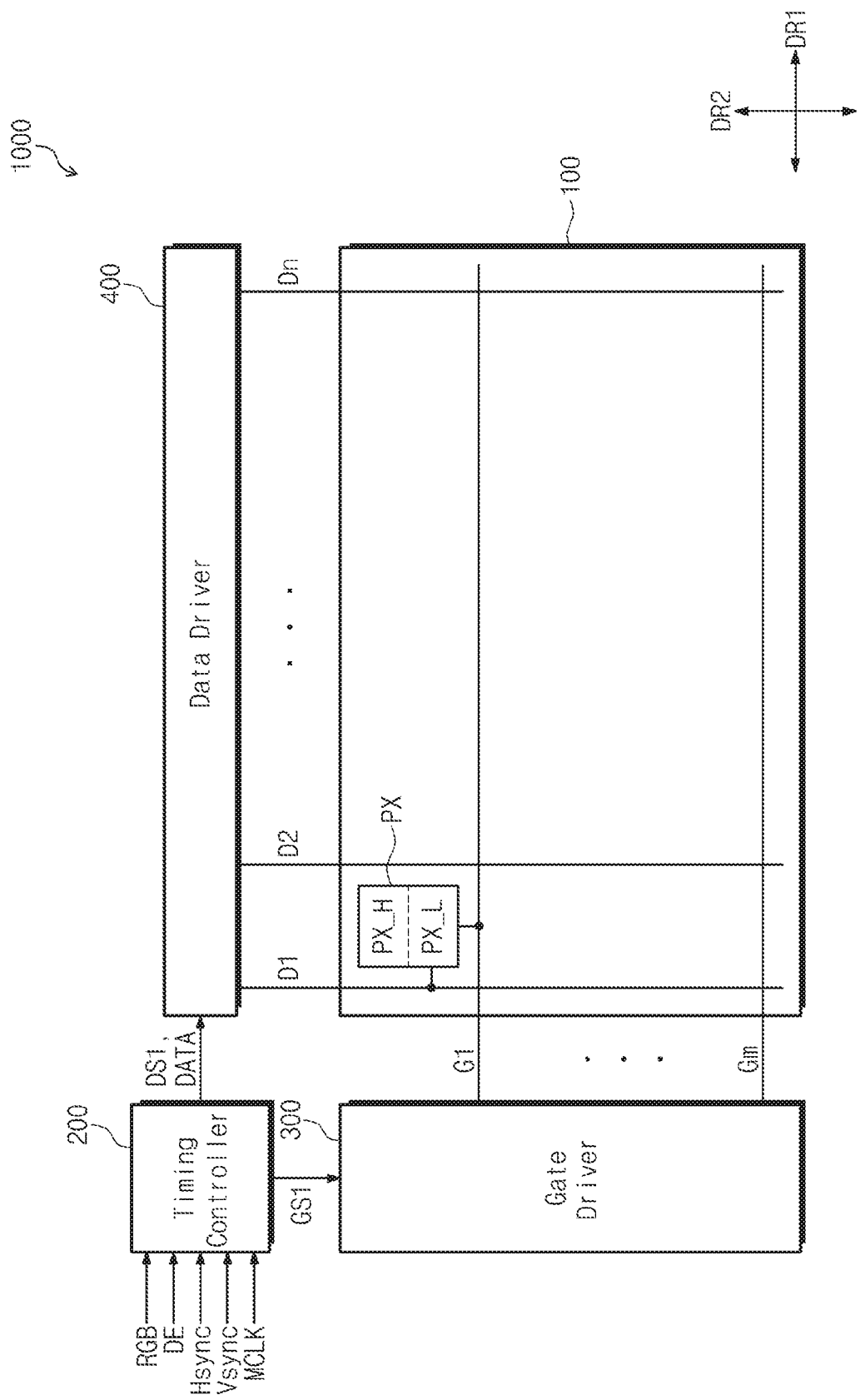
FIG. 1 is a block diagram showing a liquid crystal display device according to an exemplary embodiment of the present inventive concept.

FIG. 1 is a block diagram showing a liquid crystal display device 1000 according to an exemplary embodiment of the present inventive concept.

Referring to FIG. 1, the liquid crystal display device 1000 includes a display panel 100, a timing controller 200, a gate driver 300, and a data driver 400.

The display panel 100 includes a lower substrate, an upper substrate facing the lower substrate, and a liquid crystal layer disposed between the lower and upper substrates.

The display panel 100 includes a plurality of gate lines G1 to Gm extending in a first direction DR1 and a plurality of data lines D1 to Dn extending in a second direction DR2 crossing the first direction DR1. The gate lines G1 to Gm and the data lines D1 to Dn define pixel areas and pixels are disposed in the pixel areas, respectively. FIG. 1 shows a pixel PX connected to a first gate line G1 and a first data line D1 as a representative example.

The pixel PX displays one of a plurality of primary colors, e.g., red, green, blue, and white colors, but the primary colors are not limited thereto. That is, the primary colors may further include yellow, cyan, magenta, etc.

The pixel PX includes a first pixel PX_H and a second pixel PX_L, which are capable of displaying images having different grayscales. The first pixel PX_H and the second pixel PX_L may be referred to as sub-pixels of the pixel PX. The first and second pixels PX_H and PX_L are charged with pixel voltages having different voltage levels from each other, and thus a side visibility or a viewing angle of the pixel PX may be improved.

The timing controller 200 receives image data RGB and control signals from an external graphic controller (not shown). The control signals include a vertical synchronization signal as a frame distinction signal Vsync, a horizontal synchronization signal as a row distinction signal Hsync, a data enable signal DE, in which data are output, to indicate a data input period, and a main clock signal MCLK. In embodiment, the data enable signal DE is set to a high level or maintained at the high level during a period in which image data is applied to the display panel 100.

The timing controller 200 converts the image data RGB into converted data DATA in consideration of specifications of the data driver 400 and applies the converted data DATA to the data driver 400. The timing controller 200 generates a gate control signal GS1 and a data control signal DS1. The gate control signal GS1 is applied to the gate driver 300 and the data control signal DS1 is applied to the data driver 400.

The gate control signal GS1 is a signal used to drive the gate driver 300 and the data control signal DS1 is a signal used to drive the data driver 400.

Figure 3:
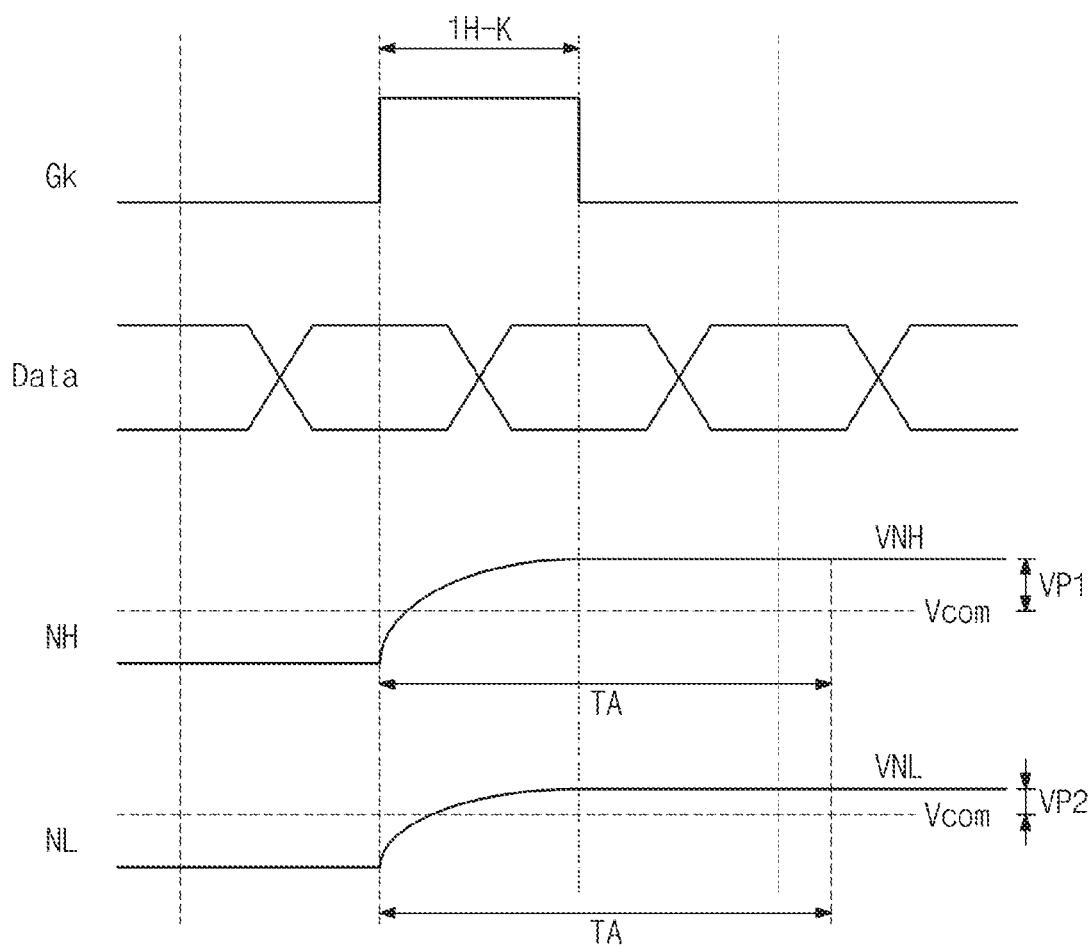
FIG. 3 is a timing diagram showing voltage levels of a signal applied to the pixel, a first node, and a second node shown in FIG. 2.

The gate driver 300 generates gate signals in response to the gate control signal GS1 and applies the gate signals to the gate lines G1 to Gm. The gate control signal GS1 includes a scan start signal indicating a start of scanning, at least one clock signal controlling an output period of a gate on voltage, and an output enable signal controlling the maintaining of the gate on voltage. For example, the high state of gate signal Gk shown in FIG. 3 is an example of the gate on voltage.

The data driver 400 generates grayscale voltages corresponding to the converted image data DATA in response to the data control signal DS1 and applies the grayscale voltages to the data lines D1 to Dn as data voltages. The data voltages include a positive (+) data voltage having a positive value with respect to the common voltage and a negative (−) data voltage having a negative value with respect to the common voltage. The data control signal DS1 includes a horizontal start signal STH indicating a start of transmitting of the image data DATA to the data driver 400, a load signal indicating application of data voltages to the data lines D1 to Dn, and a polarity control signal inverting a polarity of the data voltages with respect to the common voltage.

Each of the timing controller 200, the gate driver 300, and the data driver 400 may be directly mounted on the display panel 100, attached to the display panel 100 in a tape carrier package after being mounted on a flexible printed circuit board, or mounted on a separate printed circuit board. In an embodiment, at least one of the gate driver 300 and the data driver 400 is integrated on the display panel 100 together with the gate lines G1 to Gm, the data lines D1 to Dn, and thin film transistors of the pixels. In addition, the timing controller 200, the gate driver 300, and the data driver 400 may be integrated into a single chip.

Figure 2:
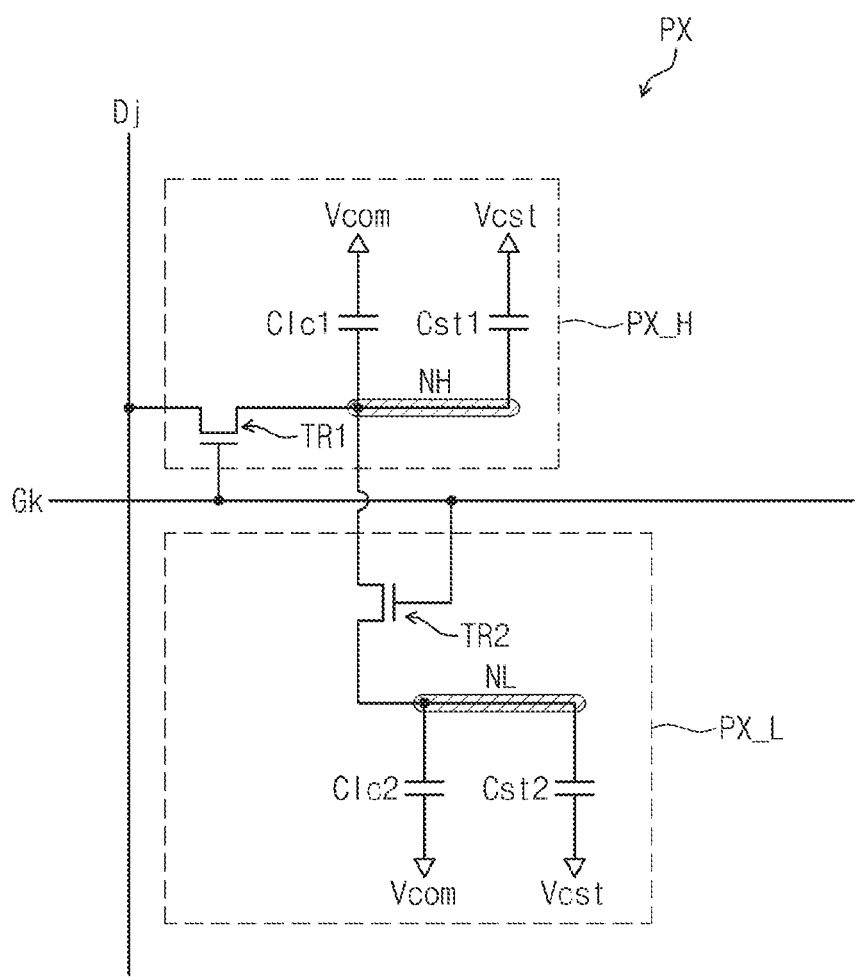
FIG. 2 is an equivalent circuit diagram showing one pixel of a display panel shown in FIG. 1 according to an exemplary embodiment of the present inventive concept.

FIG. 2 is an equivalent circuit diagram showing one pixel of a display panel shown in FIG. 1 according to an exemplary embodiment of the present inventive concept.

Referring to FIG. 2, the pixel PX includes the first pixel PX_H and the second pixel PX_L. The first and second pixels PX_H and PX_L display two grayscales different from each other on the basis of the data voltage provided through the j-th data line DLj.

The first pixel PX_H includes a first transistor TR1, a first liquid crystal capacitor Clc1, and a first storage capacitor Cst1. The second pixel PX_L includes a second transistor TR2, a second liquid crystal capacitor Clc2, and a second storage capacitor Cst2.

The first transistor TR1 includes a gate electrode connected to the k-th gate line Gk, a source electrode connected to the j-th data line Dj, and a drain electrode connected to the first liquid crystal capacitor Clc1 and the first storage capacitor Cst1.

The first liquid crystal capacitor Clc1 includes a first electrode connected to the drain electrode of the first transistor TR1 and a second electrode applied with a common voltage Vcom. The first storage capacitor Cst1 includes a first electrode connected to the drain electrode of the first transistor TR1 and a second electrode applied with a storage voltage Vcst. The first electrode of the first liquid crystal capacitor Clc1 and the first electrode of the first storage capacitor Cst1 may be defined as a first node NH.

The second transistor TR2 includes a gate electrode connected to the k-th gate line Gk, a drain electrode connected to the second liquid crystal capacitor Clc2 and a second storage capacitor Cst2, and a source electrode connected to the first node NH, i.e., the drain electrode of the first transistor TR1.

The second liquid crystal capacitor Clc2 includes a first electrode connected to the drain electrode of the second transistor TR2 and a second electrode applied with the common voltage Vcom. The second storage capacitor Cst2 includes a first electrode connected to the drain electrode of the second transistor TR2 and a second electrode applied with the storage voltage Vcst. The second electrode of the second liquid crystal capacitor Clc2 and the second electrode of the second storage capacitor Cst2 may be defined as a second node NL.

FIG. 3 is a timing diagram showing voltage levels of a signal applied to the pixel, the first node NH, and the second node NL shown in FIG. 2.

Referring to FIGS. 2 and 3, the gate signal is applied to the k-th gate line Gk during a k-th horizontal scan period 1H-K. The first and second transistors TR1 and TR2 are turned on during the k-th horizontal scan period 1H-K. Data corresponding to a rising time of the gate signal applied to the k-th gate line Gk is applied to the j-th data line Dj as the data voltage. The data voltage applied to the j-th data line Dj is applied to the first pixel PX_H through the first transistor TR1.

A voltage of the first node NH increases when the first transistor TR1 is turned on, and then has a first level VNH after a predetermined time TA lapses. In an embodiment, the first level VNH is less than the data voltage applied to the j-th data line Dj during the k-th horizontal scan period 1H-K. In an embodiment, the first level VNH is equal to the data voltage applied to the j-th data line Dj during the k-th horizontal scan period 1H-K.

The predetermined time TA corresponds to a period in which the voltage of the first node NH reaches a steady state. As an example, the predetermined time TA may be determined as one frame period. In an embodiment, gate signals are applied sequentially to all gate lines of the display panel 100 over the course of one frame period.

The first liquid crystal capacitor Clc1 is charged with a first pixel voltage corresponding to a difference between the voltage of the first node NH and the common voltage Vcom.

The data voltage applied to the j-th data line Dj is applied to the second pixel PX_L through the first and second transistors TR1 and TR2.

A voltage of the second node NL increases when the first and second transistors TR1 and TR2 are turned on, and then has a second level VNL after the predetermined time TA lapses. In an embodiment, the second level VNL is less than the first level VNH. In other words, the voltage of the second node NL increases slower than the voltage of the first node NH. For example, the slope of the curve of the voltage of the first node NH is greater or steeper than the slope of the voltage of the second node NL during part of time TA. A time constant of the second pixel PX_L is greater than a time constant of the first pixel PX_H since the second transistor TR2 serves as a resistance. In another embodiment, the second level VNL is equal to the first level VNH.

The second liquid crystal capacitor Clc2 is charged with a second pixel voltage corresponding to a difference between the voltage of the second node NL and the common voltage Vcom.

The first pixel voltage VP1 is greater than the second pixel voltage VP2 at a time point at which the predetermined time TA lapses from the rising time of the gate signal applied to the k-th gate line Gk. Since the first and second pixel voltages VP1 and VP2 are different from each other, the grayscale displayed through the first pixel PX_H is different from the grayscale displayed through the second pixel PX_L. In an embodiment, the grayscale associated with the first pixel voltage VP1 of the first pixel PX_H is higher than the grayscale associated with the second pixel voltage VP2 of the second pixel PX_L within the same pixel.

Since the voltage VNL of the second node NL increases slower than the voltage VNH of the first node NH, the first pixel voltage VP1 is greater than the second pixel voltage VP2 even though the predetermined time TA can have variable durations. A difference between the first level VNH and the second level VNL and a difference between the first pixel voltage VP1 and the second pixel voltage VP2 may be increased by increasing the resistance of the second transistor TR2. For instance, the resistance of the second transistor TR2 may be varied by changing a channel length and/or a channel width of the second transistor TR2. For example, the second transistor TR2 may be selected from among a plurality of transistors with different channel length and channel width settings. Accordingly, the first and second transistors TR1 and TR2 may have different resistances while being turned on.

Figure 4:
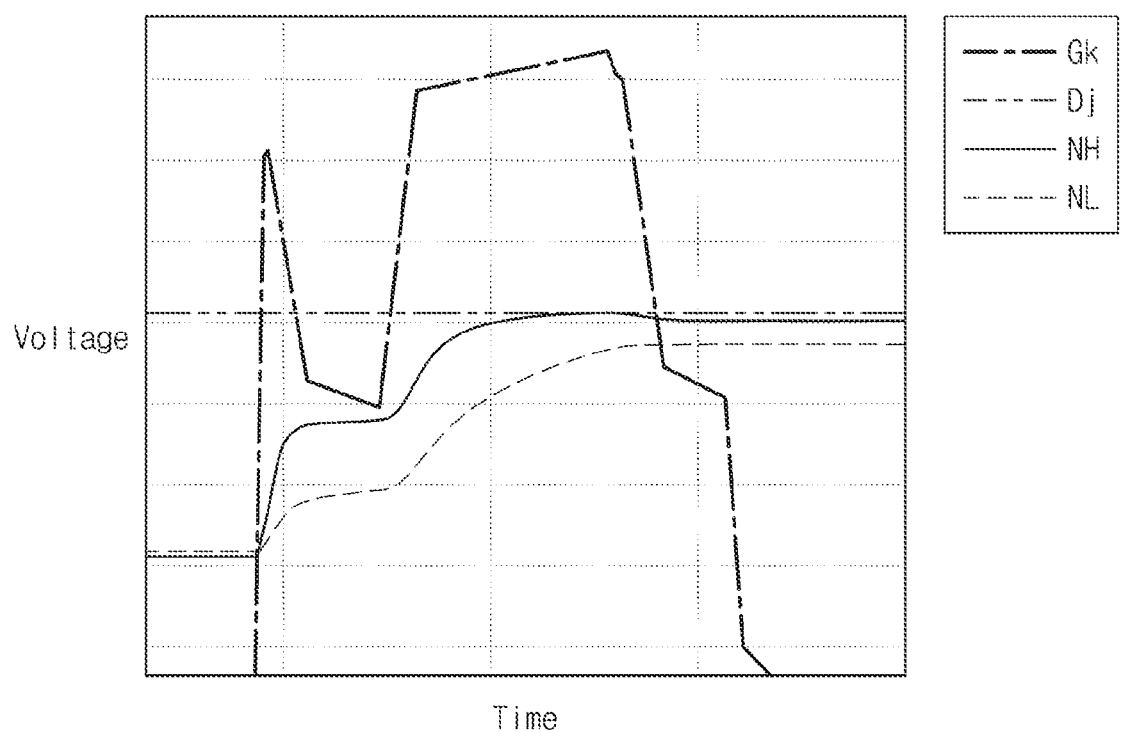
FIG. 4 is a graph showing a simulated result of the pixel shown in FIG. 2.

FIG. 4 is a graph showing a simulated result of the pixel shown in FIG. 2.

Referring to FIGS. 2 and 4, the voltage of the first node NH and the voltage of the second node NL increase due to the gate signal applied to the k-th gate line Gk and the data voltage applied to the j-th data line. In addition, due to the structure of the pixel PX shown in FIG. 2, the voltage VNH of the first node NH is higher than the voltage VNL of the second node NL.

The liquid crystal display device 1000 includes one gate line and one data line with respect to each pixel PX, and thus the number of the gate lines and the number of the data lines, which are required to drive the pixel PX of the liquid crystal display device 1000, may be minimized. In addition, pixels in the liquid crystal display device according to the present exemplary embodiment display two grayscales different from each other using two transistors disposed in one pixel PX. Therefore, the side visibility of the liquid crystal display device may be improved and the aperture ratio of the display may be increased.

When one terminal of the first and second transistors TR1 and TR2 is directly connected to the electrode applied with the common voltage Vcom or the storage voltage Vcst, an IR-drop occurs, and as a result, brightness of the image becomes irregular depending on positions of the pixels in the display panel. In the liquid crystal display device 1000 according to at least one exemplary embodiment, one terminal of the first and second transistors TR1 and TR2 is not directly connected to the electrode applied with the common voltage Vcom or the storage voltage Vcst. Thus, the liquid crystal display device 1000 according to at least one exemplary embodiment does not include a path through which electric charges passing through the first and second transistors TR1 and TR2 directly escape. Accordingly, the brightness of the image may be prevented from becoming irregular in the pixels due to the IR-drop.

Figure 5:
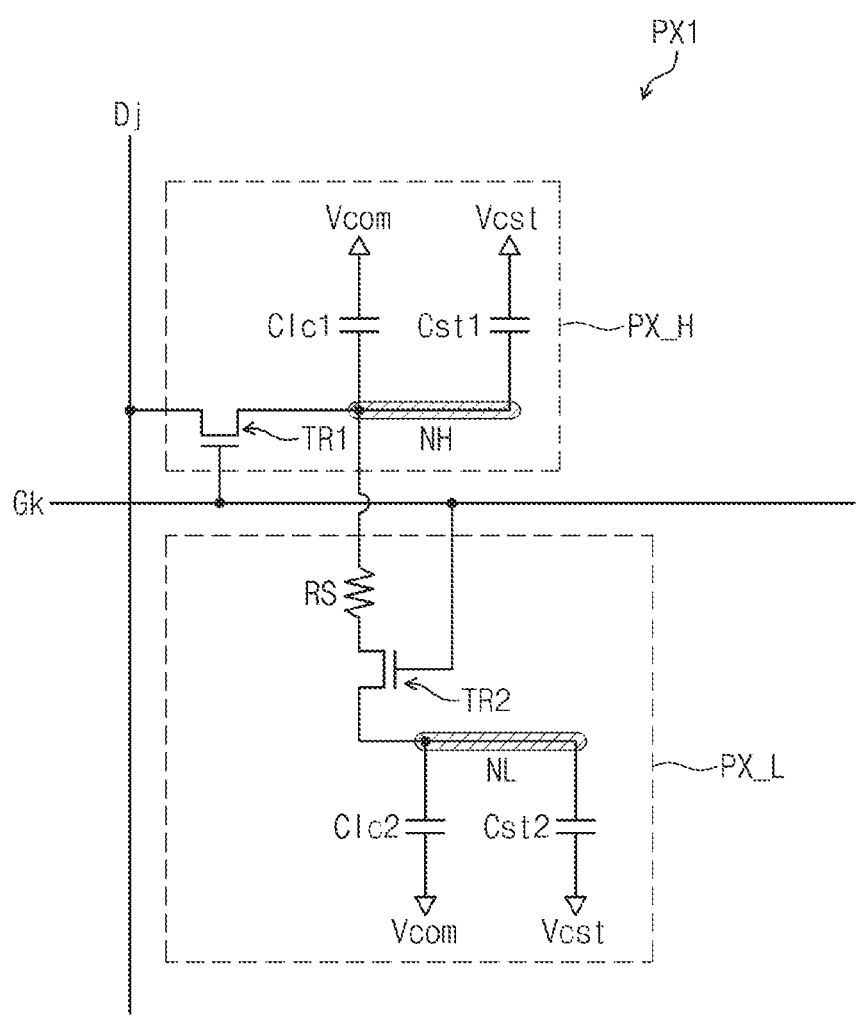
FIG. 5 is an equivalent circuit diagram showing one pixel of a display panel shown in FIG. 1 according to an exemplary embodiment of the present inventive concept.

FIG. 5 is an equivalent circuit diagram showing one pixel PX1 of a display panel shown in FIG. 1 according to an exemplary embodiment of the present inventive concept. In FIG. 5, different features of the pixel PX1 from those of the pixel PX shown in FIG. 2 will be described in detail.

Referring to FIG. 5, the pixel PX1 further includes an auxiliary resistor RS. In detail, the second pixel PX_L further includes the auxiliary resistor RS. The auxiliary resistor RS is connected between the first node NH and the source electrode of the second transistor TR2.

The auxiliary resistor RS is connected to the second transistor TR2 in series to increase the time constant of the second pixel PX_L. The auxiliary resistor RS is formed of a resistive material that makes contact with the drain electrode of the first transistor TR1 and the second transistor TR2. As an example, the resistive material includes at least one of amorphous silicon or intrinsic silicon.

According to a display apparatus including the pixel PX1 shown in FIG. 5, a difference in voltage between the first node NH and the second node NL may be more easily controlled using the auxiliary resistor RS added to the pixel shown in FIG. 2.

Figure 6:
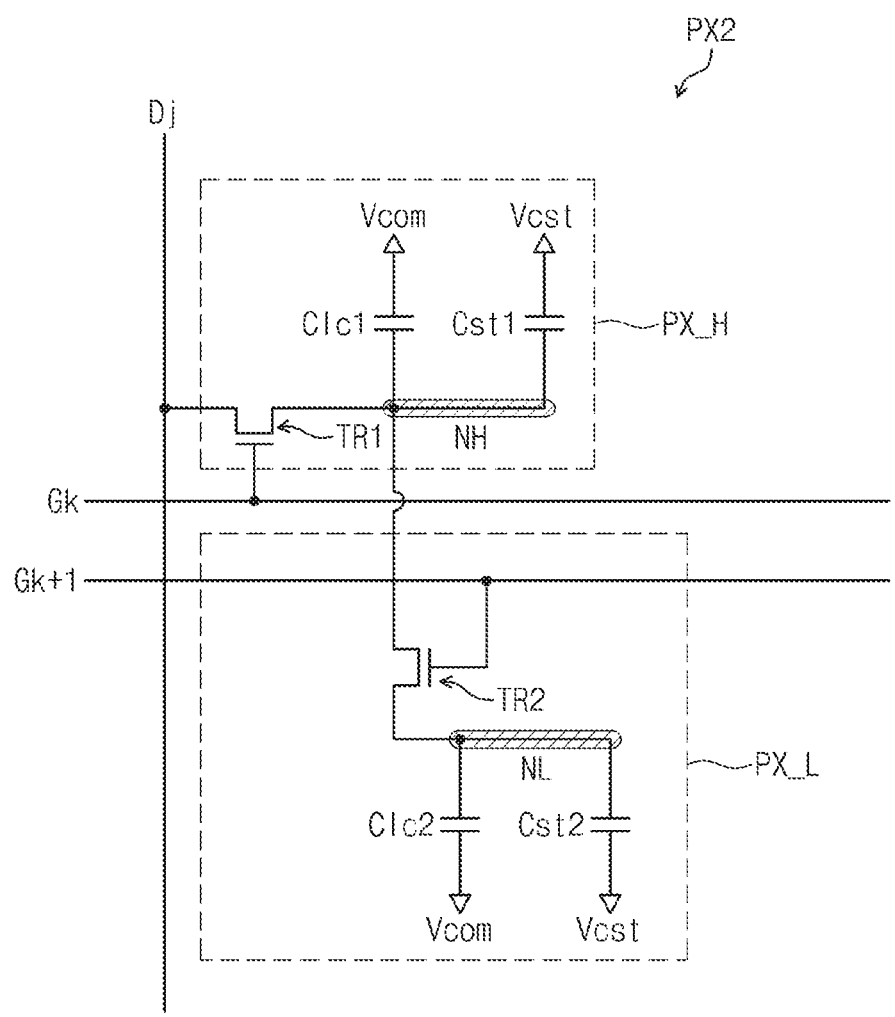
FIG. 6 is an equivalent circuit diagram showing one pixel of a display panel shown in FIG. 1 according to an exemplary embodiment of the present inventive concept.

FIG. 6 is an equivalent circuit diagram showing one pixel PX2 of a display panel shown in FIG. 1 according to an exemplary embodiment of the present inventive concept. In FIG. 6, different features of the pixel PX2 from those of the pixel PX shown in FIG. 2 will be described in detail.

Referring to FIG. 6, the pixel PX2 is connected to one data line Dj and two gate lines Gk and Gk+1. The pixel PX2 is connected to successive two gate lines Gk and Gk+1 and includes a first pixel PX_H and a second pixel PX_L.

The first pixel PX_H includes a first transistor TR1, a first liquid crystal capacitor Clc1, and a first storage capacitor Cst1. The second pixel PX_L includes a second transistor TR2, a second liquid crystal capacitor Clc2, and a second storage capacitor Cst2.

The gate electrode of the first transistor TR1 and the gate electrode of the second transistor TR2 are respectively connected to different gate lines from each other. The gate electrode of the first transistor TR1 is connected to the k-th gate line Gk and the gate electrode of the second transistor TR2 is connected to the (k+1)th gate line Gk+1.

Figure 7:
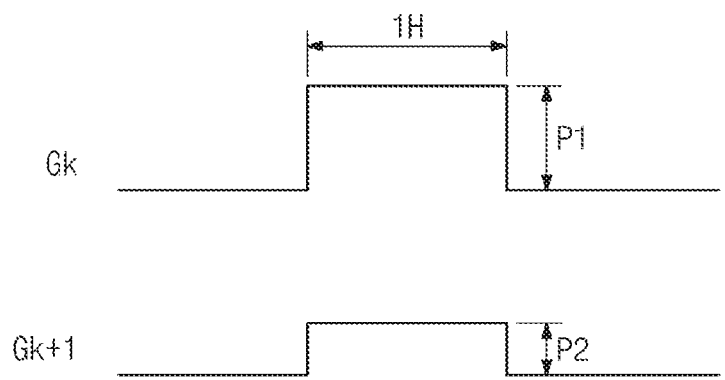
FIG. 7 is a view showing gate signals applied to a k-th gate line and a (k+1)th gate line shown in FIG. 6.

FIG. 7 is a view showing gate signals applied to the k-th gate line Gk and the (k+1)th gate line Gk+1 shown in FIG. 6.

Referring to FIGS. 6 and 7, a k-th gate signal is applied to the k-th gate line Gk and a (k+1)th gate signal is applied to the (k+1)th gate line Gk+1.

The k-th gate signal and the (k+1)th gate signal are in a high state during the same horizontal scan period 1H. In an embodiment, the high state corresponds to the gate on voltage.

The k-th gate signal and the (k+1)th gate signal have different pulse heights from each other. As an example, the k-th gate signal has a first pulse height P1 and the (k+1)th gate signal has a second pulse height P2. The second pulse height P2 is lower than the first pulse height P1. The gate driver 300 is configured to generate the adjacent gate signals having the different pulse heights.

The second transistor TR2 has a resistance determined by the second pulse height P2. According to the display apparatus including the pixel PX2 shown in FIG. 6, the difference in voltage between the first node NH and the second node NL may be more easily controlled by adding the (k+1)th gate line Gk+1 connected to the gate electrode of the second transistor TR2 and changing the second pulse height P2 of the (k+1)th gate signal applied to the (k+1)th gate line Gk+1.

Figure 8:
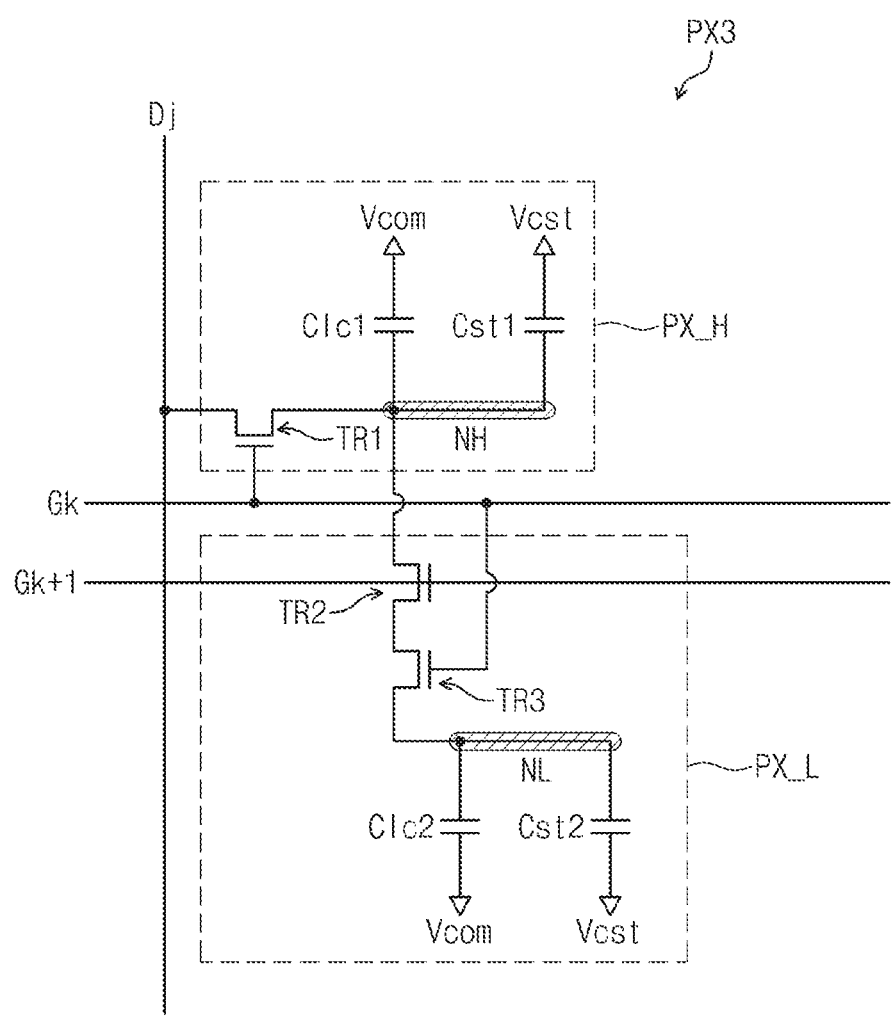
FIG. 8 is an equivalent circuit diagram showing one pixel of a display panel shown in FIG. 1 according to an exemplary embodiment of the present inventive concept.

FIG. 8 is an equivalent circuit diagram showing one pixel PX3 of a display panel shown in FIG. 1 according to an exemplary embodiment of the present inventive concept. In FIG. 8, different features of the pixel PX3 from those of the pixel PX shown in FIG. 2 will be described in detail.

Referring to FIG. 8, the pixel PX3 is connected to one data line Dj and two gate lines Gk and Gk+1 and includes a first pixel PX_H and a second pixel PX_L. The pixel PX3 is connected to two successive gate lines Gk and Gk+1.

The first pixel PX_H includes a first transistor TR1, a first liquid crystal capacitor Clc1, and a first storage capacitor Cst1. The second pixel PX_L includes a second transistor TR2, a third transistor TR3, a second liquid crystal capacitor Clc2, and a second storage capacitor Cst2.

The first transistor TR1 includes a gate electrode connected to the k-th gate line Gk, a source electrode connected to the j-th data line Dj, and a drain electrode connected to the first liquid crystal capacitor Clc1 and the first storage capacitor Cst1.

The second transistor TR2 includes a gate electrode connected to the (k+1)th gate line Gk+1, a source electrode connected to the first node NH, and a drain electrode connected to the third transistor TR3.

The third transistor TR3 includes a gate electrode connected to the k-th gate line Gk, a drain electrode connected to the second liquid crystal capacitor Clc2 and the second storage capacitor Cst2, and a source electrode connected to the drain electrode of the third transistor TR3.

The gate electrode of the first transistor TR1 and the gate electrode of the third transistor TR3 are connected to the same gate line Gk. The gate electrode of the first transistor TR1 and the gate electrode of the second transistor TR2 are connected to different gate lines from each other.

However, according to an exemplary embodiment, the gate electrode of the third transistor TR3 is connected to the (k+1)th gate line Gk+1 and the gate electrode of the second transistor TR2 is connected to the k-th gate line Gk.

Referring to FIGS. 7 and 8, the k-th gate signal is applied to the k-th gate line Gk and the (k+1)th gate signal is applied to the (k+1)th gate line Gk+1.

The k-th gate signal and the (k+1)th gate signal have different pulse heights from each other. As an example, the k-th gate signal has the first pulse height P1 and the (k+1)th gate signal has the second pulse height P2. The first pulse height P1 is higher than the second pulse height P2.

The second transistor TR2 has a resistance determined by the second pulse height P2. According to the display apparatus including the pixel PX3 shown in FIG. 8, the difference in voltage between the first node NH and the second node NL may be more easily controlled by adding the second transistor TR2 and the (k+1)th gate line Gk+1 connected to the gate electrode of the second transistor TR2 and changing the second pulse height P2 of the (k+1)th gate signal applied to the (k+1)th gate line Gk+1.

Although exemplary embodiments of the present inventive concept have been described, it is to be understood that the present inventive concept is not limited to these exemplary embodiments and various changes and modifications can be made to these embodiments by one of ordinary skill in the art that are within the spirit and scope of the present inventive concept.

What is claimed is:

1. A display apparatus comprising:
a first gate line;
a second gate line disposed adjacent to the first gate line;
a data line; and
a pixel connected to the first gate line, the second gate line, and the data line, the pixel comprising a first pixel and a second pixel, which display two grayscales different from each other on the basis of a data voltage provided through the data line,
the first pixel comprising:
a first transistor comprising a gate electrode connected to the first gate line and a first terminal connected to the data line; and
a first liquid crystal capacitor connected to a second terminal of the first transistor, and the second pixel comprising:
a second transistor comprising a gate electrode connected to the second gate line and a first terminal connected to the second terminal of the first transistor; and
a second liquid crystal capacitor connected to a second terminal of the second transistor;
wherein a first gate signal applied to the first gate line maintains a first high state during a horizontal scan period and a second gate signal applied to the second gate line maintains a second high state during the same horizontal scan period, and
wherein the first high state has a first pulse height and the second high state has a second pulse height lower than the first pulse height of the first high state,
wherein the first gate signal transitions to the first high state at a beginning of the horizontal scan period and maintains the first high state for an entirety of the horizontal scan period, and the second gate signal transitions to the second high state at the beginning of the same horizontal scan period and maintains the second high state for an entirety of the same horizontal scan period.

2. The display apparatus of claim 1, wherein the second terminal of the first transistor has a first level after a predetermined time lapses from a rising time of the first gate signal, and the second terminal of the second transistor has a second level lower than the first level after a predetermined time lapses from the rising time of the first gate signal.

3. The display apparatus of claim 1, wherein the second pixel further comprises a third transistor connected to the second transistor in series.

4. The display apparatus of claim 3, wherein the third transistor comprises a gate electrode connected to the first gate line, a first terminal connected to the second terminal of the second transistor, and a second terminal of the third transistor is connected to the second liquid crystal capacitor.

5. The display apparatus of claim 4, wherein the second terminal of the first transistor has a first level after a predetermined time lapses from a rising time of a gate signal applied to the first gate line, and the second terminal of the second transistor has a second level lower than the first level after a predetermined time lapses from the rising time of the gate signal applied to the gate line.

6. The display apparatus of claim 1, wherein the first gate signal and the second gate signal transition to a low state lower than the first and second high states at an end of the same horizontal scan period.

7. A display apparatus comprising:
a first gate line;
a second gate line disposed adjacent to the first gate line;
a data line; and
a pixel connected to the first gate line, the second gate line, and the data line, the pixel comprising a first pixel and a second pixel, which display two grayscales different from each other on the basis of a data voltage provided through the data line,
the first pixel comprising:
a first transistor comprising a gate electrode connected to the first gate line and a first terminal connected to the data line; and
a first liquid crystal capacitor connected to a second terminal of the first transistor, and
the second pixel comprising:
a second transistor comprising a gate electrode connected to the second gate line and a first terminal connected to the second terminal; and a second liquid crystal capacitor connected to a second terminal of the second transistor;

wherein a first gate signal applied to the first gate line maintains a first high state during a horizontal scan period and a second gate signal applied to the second gate line maintains a second high state during the same horizontal scan period, and wherein the first high state has a first pulse height and the second high state has a second pulse height lower than the first pulse height of the first high state, wherein the first gate signal maintains the first high state for an entirety of the horizontal scan period and transitions to a low state lower than the first and second high states at an end of the horizontal scan period, and the second gate signal maintains the second high state for an entirety of the same horizontal scan period and transitions to the low state at the end of the same horizontal scan period.

8. The display apparatus of claim 7, wherein the first gate signal transitions to the first high state at a beginning of the horizontal scan period and the second gate signal transitions to the second high state at the beginning of the same horizontal scan period.

9. A display apparatus comprising:
a first gate line;
a second gate line disposed adjacent to the first gate line;
a data line; and
a pixel connected to the first gate line, the second gate line, and the data line, the pixel comprising a first pixel and a second pixel, which display two grayscales different from each other on the basis of a data voltage provided through the data line, the first pixel comprising:
a first transistor comprising a gate electrode connected to the first gate line and a first terminal connected to the data line; and
a first liquid crystal capacitor connected to a second terminal of the first transistor, and the second pixel comprising:
a second transistor comprising a gate electrode connected to the second gate line and a first terminal connected to the second terminal of the first transistor;
a third transistor comprising a gate electrode connected to the first gate line and a first terminal connected to a second terminal of the second transistor, and
a second liquid crystal capacitor connected to a second terminal of the third transistor, and wherein a first gate signal applied to the first gate line maintains a first high state during a horizontal scan period and a second gate signal applied to the second gate line maintains a second high state during the same horizontal scan period, and wherein the first high state has a first pulse height and the second high state has a second pulse height lower than the first pulse height of the first high state, wherein the first gate signal maintains the first high state for an entirety of the horizontal scan period, and the second gate signal maintains the second high state for an entirety of the same horizontal scan period.

* * * * *